(12) United States Patent
DeLand et al.

(10) Patent No.: US 9,839,996 B2
(45) Date of Patent: Dec. 12, 2017

(54) APPARATUS AND METHOD FOR REMOTE FASTENER INSTALLATION

(71) Applicant: The Boeing Company, Chicago, IL (US)

(72) Inventors: James Albert DeLand, Bothell, WA (US); Roger A. Gage, Marysville, WA (US); Darrell Darwin Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 277 days.

(21) Appl. No.: 14/724,892

(22) Filed: May 29, 2015

(65) Prior Publication Data

US 2015/0266174 A1    Sep. 24, 2015

Related U.S. Application Data

(62) Division of application No. 13/663,242, filed on Oct. 29, 2012, now Pat. No. 9,056,376.

(51) Int. Cl.
*B64F 5/10* (2017.01)
*B25B 23/00* (2006.01)
*B23P 19/06* (2006.01)

(52) U.S. Cl.
CPC ........ *B25B 23/0085* (2013.01); *B23P 19/069* (2013.01); *B64F 5/10* (2017.01); *B23P 2700/01* (2013.01); *Y10T 29/49948* (2015.01)

(58) Field of Classification Search
CPC ...... B25B 23/0085; B64F 5/10; B23P 19/069; B23P 2700/01; Y10T 29/49948
See application file for complete search history.

(56) References Cited

U.S. PATENT DOCUMENTS

| | | | |
|---|---|---|---|
| 2,978,936 | A | 4/1961 | Orner |
| 4,385,533 | A | 5/1983 | Collins |
| 4,387,611 | A | 6/1983 | Junkers |
| 4,432,256 | A | 2/1984 | Apparicio, Jr. et al. |
| 5,139,092 | A | 8/1992 | Boyle |

(Continued)

FOREIGN PATENT DOCUMENTS

JP    2008-132569 A    6/2008

OTHER PUBLICATIONS

International Search Report and Written Opinion dated May 30, 2014 for PCT/US2013/060670, 12 pages.

*Primary Examiner* — Robert Scruggs
(74) *Attorney, Agent, or Firm* — MH2 Technology Law Group LLP (57) ABSTRACT

A tool configured to install and torque multiple fasteners, such as nuts and/or bolts, positioned in confined and/or hard to reach areas. The tool includes a body portion, a plurality of fastener retainers, and a structure which permits both the remote tightening and torquing of such fasteners. The tool also provides an actuator for the remote release of torque loads which may build up in the fastener retainers during such torquing of the fasteners. The actuator includes a lever arm pivotally connected to the body portion and a cam that is rotatable between a first position and a second position. A linkage is engaged by the cam and urges the lever arm to a torquing position upon the cam being in the first position and to a torque release position upon the cam being in the second position.

17 Claims, 7 Drawing Sheets

(56) References Cited

U.S. PATENT DOCUMENTS

| | | | |
|---|---|---|---|
| 5,433,657 A * | 7/1995 | Bovone | B25B 11/005 269/21 |
| 5,515,752 A * | 5/1996 | Sawano | B23P 19/06 81/57.36 |
| 6,427,558 B1 | 8/2002 | DeLand | |
| 9,056,376 B2 * | 6/2015 | DeLand | B25B 23/0085 |
| 2004/0117962 A1 | 6/2004 | Bioch et al. | |
| 2008/0244888 A1 * | 10/2008 | Sarh | B21J 15/14 29/402.01 |
| 2010/0308171 A1 * | 12/2010 | Kelley | B23P 19/04 244/132 |

\* cited by examiner

APPARATUS AND METHOD FOR REMOTE FASTENER INSTALLATION

RELATED APPLICATION DATA

This application is a divisional application and claims benefit of U.S. nonprovisional application Ser. No. 13/663,242, filed Oct. 29, 2012, and the entirety of the foregoing nonprovisional application is incorporated herein by reference.

TECHNOLOGICAL FIELD

The present disclosure relates generally to an apparatus and method for the installation of fasteners and, in particular, to the remote installation and torquing of multiple fasteners, such as nuts and/or bolts.

BACKGROUND

In manufacturing objects, such as aircraft, a number of components may be secured to one another. For example, skin panels may be attached to frames, spars may be attached to rib structures, and other components may be attached to each other to form an aircraft. Fasteners may be used to attach parts to each other. A fastener may be a hardware device that mechanically joins or affixes two or more components together and may include bolts, nuts and washers, screws, pins, etc.

In certain situations, multiple fasteners may be required to be installed and torqued at a remote distance, such as perhaps 40 inches or more within a cavity or channel. This could be the case in a number of circumstances, and could occur, for example, in construction of a horizontal stabilizer of an aircraft. In such a situation, workers may need to reach into a channel to set fasteners, such as nuts, bolts and/or washers, apply torque to such fasteners, and react to (oppose) such applied torque using wrenches and/or other tools. Although this methodology may be sufficient, such manual installation and torquing of multiple fasteners in a relatively confined and/or difficult-to-access locations may be time-consuming, manpower-intensive, expensive, and/or involve other difficulties.

BRIEF SUMMARY

Accordingly, it would be desirable to have a system, apparatus, and method that take into account at least some of the issues discussed above, as well as other potential issues.

Example embodiments of the present disclosure are generally directed to a system, an apparatus, and a method for remote fastener installation and torquing, and more specifically, for releasably reacting to (releasably opposing) the torque, or a portion thereof, applied to one or more fasteners. According to one aspect of example embodiments, the apparatus includes a tool for torquing fasteners, comprising a plurality of fastener structures, each configured to engage one of the fasteners and an actuator operatively engageable with the fastener structures. The actuator is movable between a first position and a second position, and in the first position, the actuator is configured to prevent rotation of at least one of the fastener structures during torquing of a fastener by opposing a torsional load induced in such fastener structure by the fastener. In the second position, the actuator is configured to simultaneously substantially eliminate the torsional load in the plurality of fastener structures.

In a further example of this embodiment, the actuator can be connected to a body portion and include a lever arm pivotally connected to the body portion and a cam that is rotatable between two positions. Also, a linkage can be provided that is engaged by the cam and that urges the lever arm to a torquing position upon the cam being in a first position, and to a "release" position upon the cam being in a second position.

In one example, the fastener installation apparatus is configured to include a support movable with respect to the body portion between a retracted position and an extended position. A support actuator is connected to the support that selectively moves the support between the retracted position and the extended position, and the fastener structures, or fastener structures, or retaining elements, are connected to the support for movement therewith between the retracted position and the extended position.

In another example, the apparatus is configured to include a plurality of index pins that engage and align the body portion with a structure, with at least one of the index pins being configured to move between a retracted position generally out of engagement with the structure and an extended position in engagement with the structure. Also included is an index pin actuator that moves an index pin between the retracted position and the extended position.

In yet another example, the apparatus is configured to include at least one vacuum cup connected to the body portion and a vacuum actuator connected to the vacuum cup that selectively draws a vacuum through the vacuum cup. The vacuum cup is configured to attach the body portion to the structure upon vacuum being drawn through the vacuum cup via the vacuum actuator, and the vacuum cup is configured to release the body portion from the structure upon vacuum not being drawn through the vacuum cup via the vacuum actuator.

In other aspects of example embodiments, a method is provided for using a tool including a plurality of retaining elements to join a first part and a second part with a first plurality of fasteners and a second plurality of fasteners, and the method comprises installing the first plurality of fasteners in the plurality of retaining elements, wherein each of the plurality of retaining elements is configured to receive one of the plurality of fasteners, and associating the first part and the second part in a desired orientation for joining. The tool is positioned relative to the first part and the second part to facilitate torsional engagement between the first plurality of fasteners and the second plurality of fasteners, and the second plurality of fasteners are installed, sequentially or simultaneously, in mating openings formed in the first part and the second part. The tool is configured to prevent rotation of the first plurality of fasteners, and the joining of the first part and the second part is done by applying a torque, sequentially or simultaneously, to the second plurality of fasteners to cause the second plurality of fasteners to rotationally engage the first plurality of fasteners, wherein the torque is transmitted from the second plurality of fasteners to the first plurality of fasteners and at least a portion of the torque is transmitted from the first plurality of fasteners to the plurality of retaining elements preventing rotation of the first plurality of fasteners. The transmission of the at least a portion of the torque from the first plurality of fasteners to the plurality of retaining elements is simultaneously eliminated, and the tool is withdrawn from the first plurality of fasteners, the first part, with the second part being joined to the first part.

One example embodiment of the present disclosure is configured to ease the release of a torque preload on a fastener structure utilizing a lever or crank arm activated cam structure. This cam structure, while in the "torque" position, may be positioned to be biased in a direction in order to minimize the force required to release the torque preload. Also, each fastener structure may be provided with a socket assembly having a spring-biased washer sleeve that holds one or more washers and nuts during installation of a member or structure, such as a rib structure prior to insertion of one or more bolts with which the nuts are threadingly received. The socket assemblies are spring-biased to facilitate engagement of the socket during the torquing process and to accommodate for different washer stacks of varying heights.

In an example embodiment of the present disclosure, a tool for installing and torquing fasteners is configured to ensure proper engagement between a fastener such as a nut, bolt, or screw of a structure, such as a rib structure, and a socket on a socket assembly. The socket assembly is connected to a reaction mechanism, which includes a supporting bar, and the supporting bar is mounted on linear bearings that are actuated by a pneumatic cylinder. When the pneumatic cylinder is activated (extended) the socket assemblies are preloaded against the nut, bolt, or screw during a torquing process. After the fasteners have been properly torqued and a reaction bar, or actuator, released, pneumatic cylinder is retracted so the sockets can be released from the nut, bolt, or screw and so that the tool is released from the rib structure. A method of using such a fastener installation tool may include: loading a fastener such as a nut and one or more washers in each socket assembly of the tool (while the reaction mechanism is in the retracted position); positioning the tool over the rib structure; aligning one or more fixed index pins with holes in the rib structure (retractable index pins may be provided which would be in a retracted position to facilitate access of the socket assembly to pass under a closed angle flange of the rib structure); using vacuum cups provided on the tool to attach the tool to the rib structure; extending the retractable index pins into index holes in the rib structure; and extending the reaction mechanism such that the socket assemblies are in contact with the rib structure flange to ensure full socket engagement.

One example thus provides a worker with a method and tool that: simultaneously and automatically reacts to (opposes) the toque at each fastener location without intervention by another worker; allows for attachment of the tool onto a structure, such as a rib structure, prior to installation into a cavity or channel, such as a rib bay; holds and contains fastener elements such as both a nut and washers during installation of the rib structure in another structure, such as a horizontal stabilizer; enables the remote release of a torque preload generated from the torquing process; and enables remote release of the tool from the rib structure.

In other aspects of example embodiments, a fastener installation apparatus and method are provided for remote installation and torquing of multiple nuts and/or bolts.

The features, functions and advantages discussed herein may be achieved independently in various example embodiments or may be combined in yet other example embodiments further details of which may be seen with reference to the following description and drawings.

BRIEF DESCRIPTION OF THE DRAWINGS

Having thus described example embodiments of the disclosure in general terms, reference will now be made to the accompanying drawings, which are not necessarily drawn to scale, and wherein:

DETAILED DESCRIPTION

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Like reference numerals refer to like elements throughout.

Figure 1:
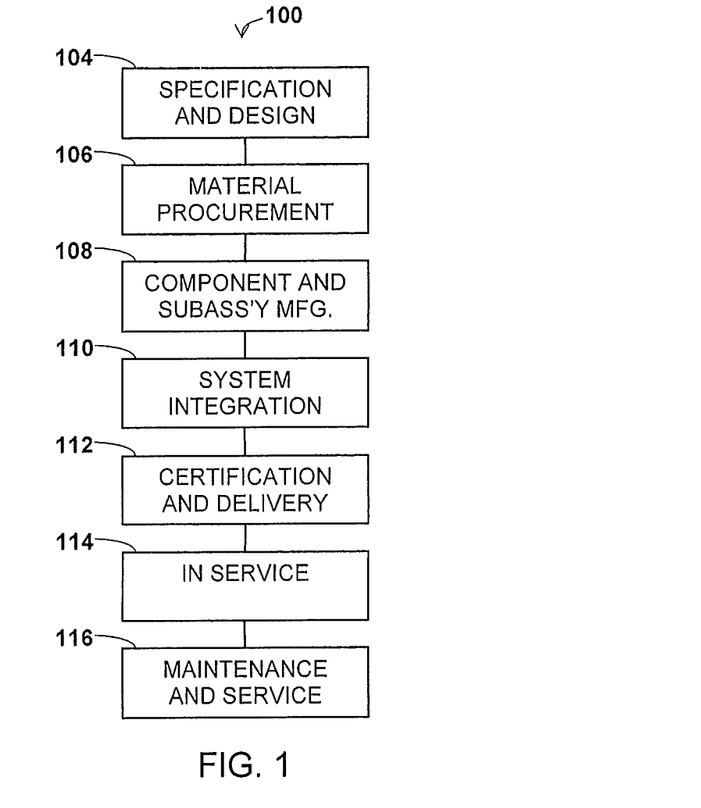
FIG. 1 is a flow diagram of aircraft production and service methodology.
Figure 2:
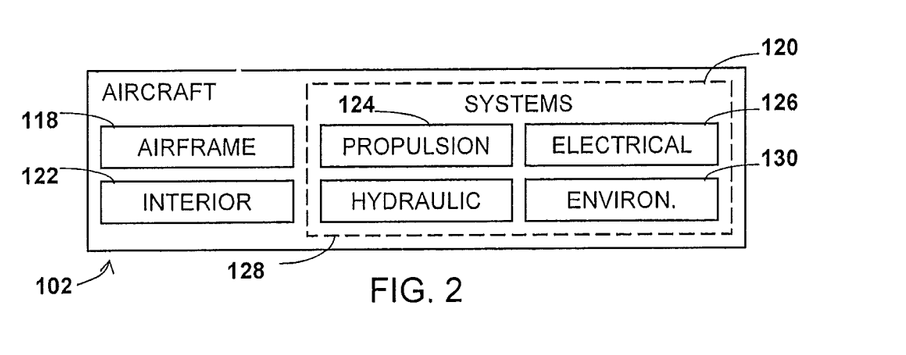
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
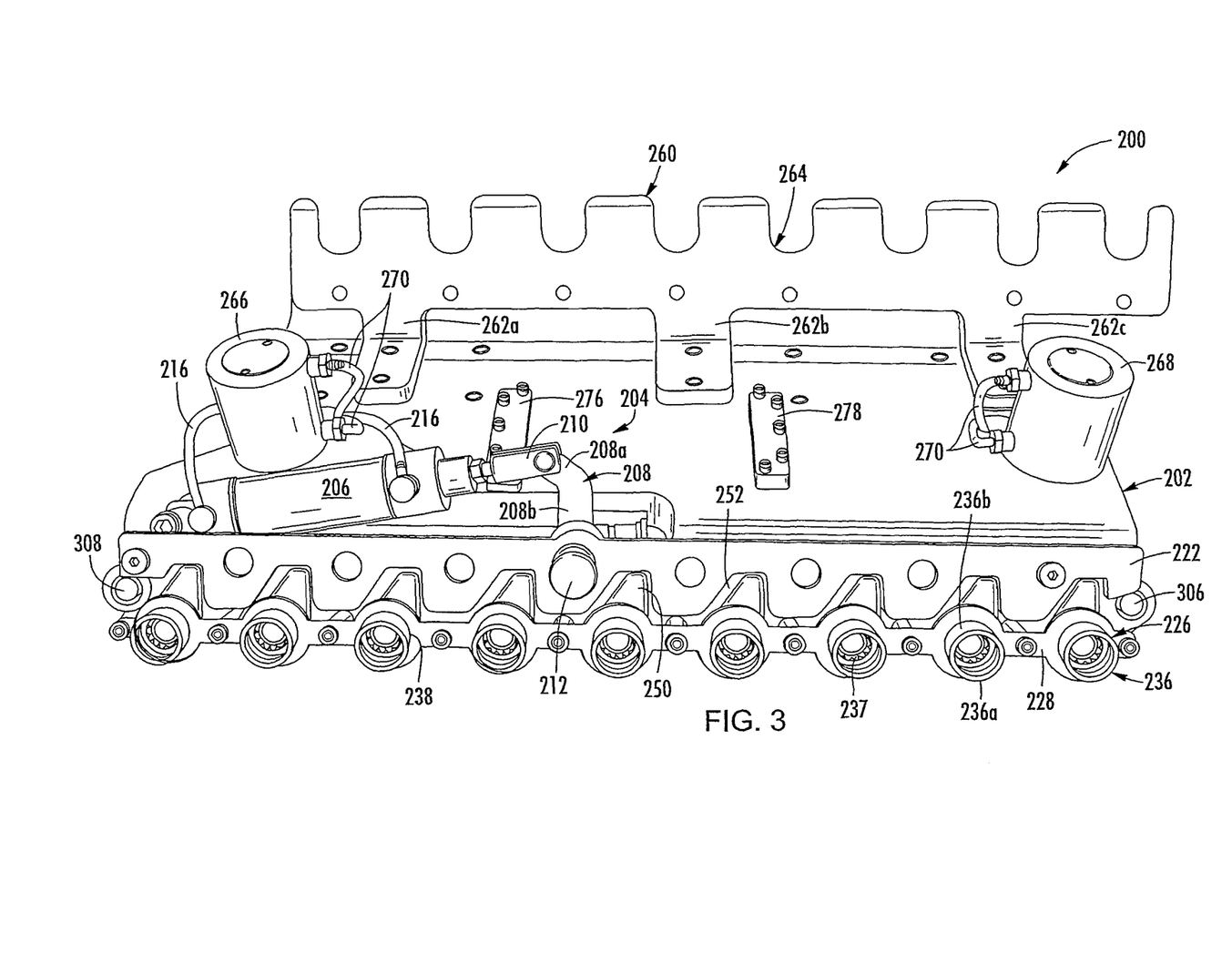
FIG. 3 illustrates a fastener installation apparatus according to one example embodiment.

In one application of the present invention, it can be used in the context of an aircraft manufacturing and service method 100, or in other manufacturing operations, such as the automotive sector, industrial sector, and commercial sector and in both terrestrial and extraterrestrial environments. Referring to one example embodiment of the present disclosure, FIG. 3 illustrates a tool apparatus, generally 200, having a platform, or body portion, generally, 202, which carries a crank arm arrangement, generally, 204, which is actuated by a pneumatic cylinder, generally 206. More specifically, crank arm arrangement 204 includes a crank arm 208 which moves between a first, or torquing, position, as shown in solid lines in FIG. 6, and a second, or "release", position, as shown in dashed lines in FIG. 6.

Crank arm 208 is connected to pneumatic cylinder 206 via a clevis coupling 210 about which a first end 208a of crank arm 208 is pivotally connected. The second end 208b of crank arm 208 is fixedly attached to a cam member 212, having a generally eccentric lobe, or cam, portion 214. Crank arm arrangement 204 is configured such that as pneumatic cylinder 206 is activated (via pneumatic air pressure being supplied via hoses 216, the shaft 220 of the pneumatic cylinder 206 advances, which in turn advances clevis coupling 210 connected thereto, which in turn moves crank arm 208 from the torquing position to the "release" position. This movement of crank arm 208, in turn, causes the lobed, or cam portion 214 of cam member 212 to rotate clockwise from a torquing position to a "release" position.

Figure 6:
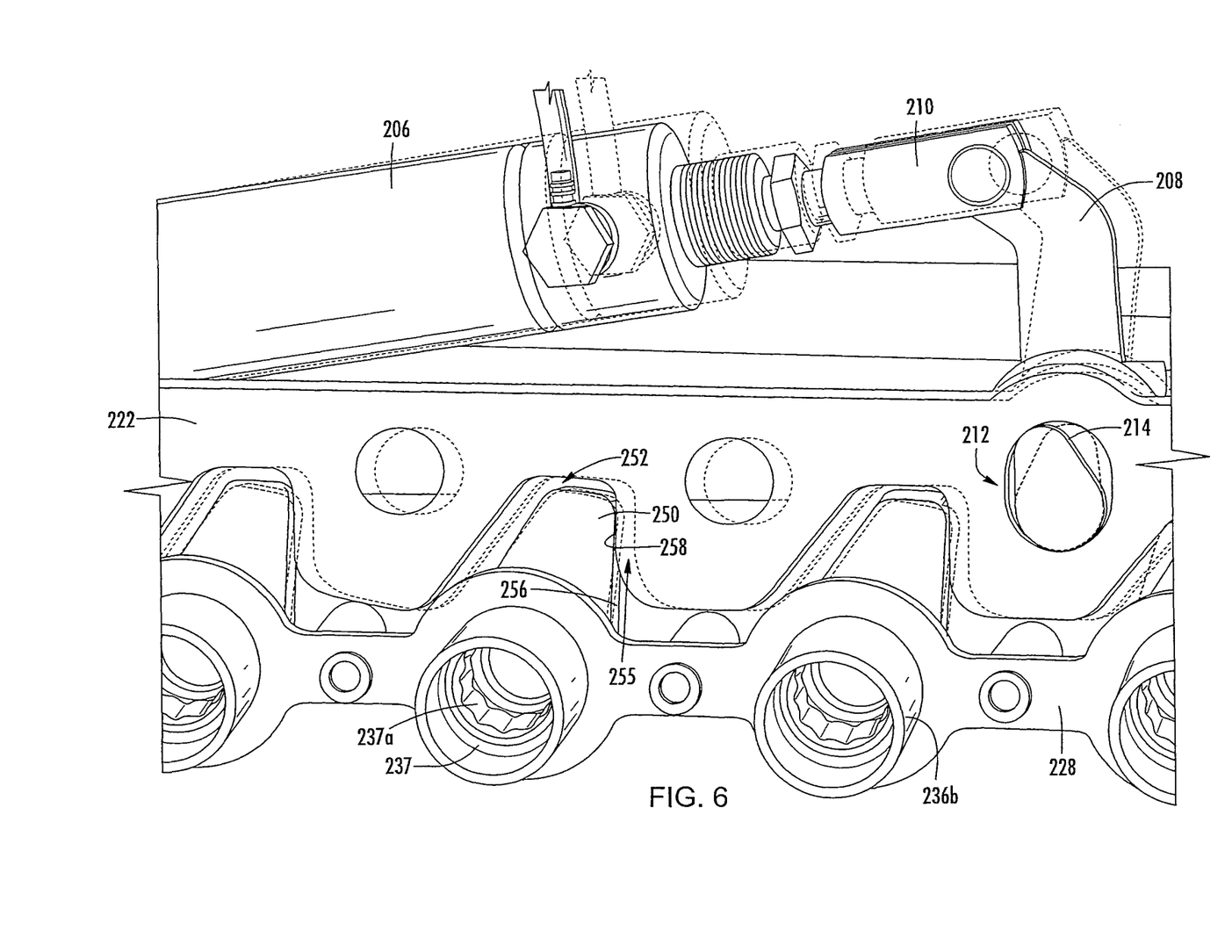
FIG. 6 illustrates in schematic form fastener retainers of a fastener installation apparatus according to one example embodiment.

An actuator, or reaction bar, generally 222, is configured for general rectilinear motion with respect to body portion 202 between a first, or "torque", position (as shown in solid lines in FIG. 6) and a second, or "release", position (as shown in dashed lines in FIG. 6). In the first position, reaction bar 222 reacts to torque applied to the fasteners (which in one example could be a bolt or washer (none shown) or a nut, generally F (FIG. 4)) by restraining one or more of the fastener structures, ore retaining elements, 226 from movement in the direction in which the torque is being applied. In the second position, reaction bar 222 facilitates the simultaneous substantial elimination of torque in fastener structures 226 by permitting, for example, a relatively slight movement of the fastener structures 226 relative to the fasteners in generally the direction in which the torque was applied. In other words, reaction bar 222 moves to the right away from the direction of a torque preload previously induced in socket structures 236 (discussed below) in order to eliminate the torque preload induced in socket structures 236. The dashed lines in FIG. 6 represent the unloaded, or release, position of reaction bar 222, and the solid lines represent the torque reaction, or preload, position.

This movement of reaction bar 222 is caused by the movement of cam member 212 back and forth through an arc (which may be as short as ¼ inch or less) as crank arm 208 is moved between the "torque" and "release" positions.

In one example, cam member 212 extends through an opening 224 in reaction bar 222, and engagement of cam portion 214 of cam member 212 causes the rectilinear motion of reaction bar 222 between the "torque" and "release" positions.

A plurality of fastener structures, or retainer elements, or fastener retainers, generally 226, are carried forward of and extend outwardly from body portion 202. Each fastener retainer 226 is carried within a socket rail, or carrier assembly, generally 228. Socket carrier assembly 228 is connected to a support, or support bar, generally 230 (FIG. 4), via spacers 232 which carry fasteners 234 which fasten socket carrier assembly to support bar 230. Each fastener retainer 226 includes a socket structure, generally 236, which includes an opening 236a and a generally cylindrical sleeve, or skirt, portion 236b in communication with opening 236a. As shown in FIG. 6, generally adjacent the opposite end of the skirt 236b is a fastener socket, or, simply "socket," 237 defining an engagement profile 237a configured to engage the lands of a fastener, such as a nut or bolt head (not shown). While engagement profile 237a is illustrated for use in connection with a nut or bolt head, it is to be understood that it could be configured to engage the driving surfaces of a screw or some other fastener, if desired.

Socket structures 236 also include a rim portion 236c (FIGS. 4 and 5) which is of greater diameter than an opening of socket carrier assembly 228 in which each socket structure 236 is carried. Because it is of greater diameter than the opening of the socket carrier assembly 228, rim 236c serves to retain socket structure 236 within opening 238 in the sense that a socket structure 236 can only move outwardly so far within the opening before rim 236c engages the surfaces of socket carrier assembly 228 adjacent such opening. While only one socket structure 236 has been discussed, it is to be understood that this arrangement is found in the plurality of fastener retainers 226 along the length of socket carrier assembly 228.

Figure 7:
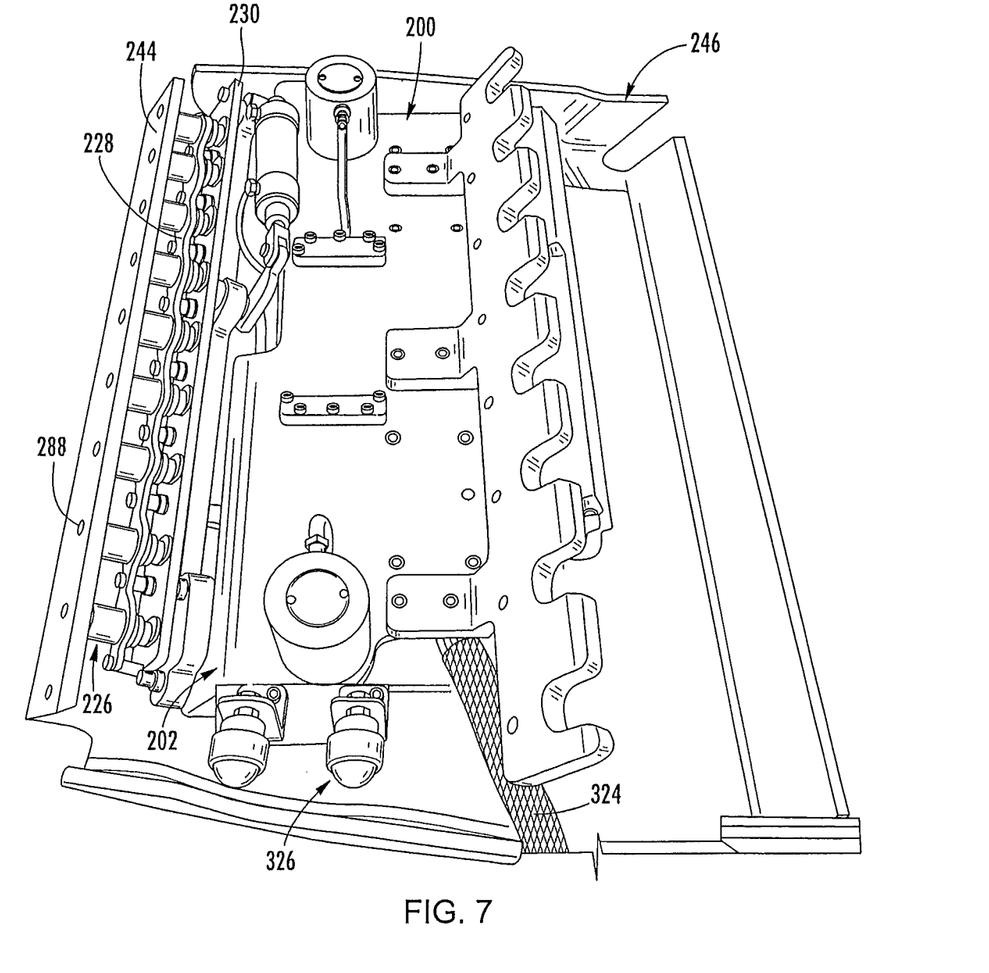
FIG. 7 illustrates a fastener installation apparatus according to one example embodiment adjacent one example of a rib structure.

Engagement profile 237a of fastener socket 237, while extending into socket structure 236, is preferably constructed of tool steel or some other suitable material in order to provide sufficient torque against a fastener when tool 200 is put into use. Socket skirt 236b, is in essence a sleeve which is movable along the length of a generally cylindrical surface of fastener socket 237, but is biased to the outermost position (where rim 236c engages the surfaces around the opening of socket carrier assembly 228 by a biasing structure), which could in one embodiment include a wave spring, or washer arrangement, generally 242. Wave spring washers 242 outwardly bias socket sleeve 236b and, in a manner discussed in more detail below, permit socket sleeve 236b to engage against the surfaces proximate a fastener, such as the threaded end of a bolt (not shown), in a secure manner, such that a nut F (FIG. 4)) and one or more washers, generally W (FIG. 4) which are carried in socket sleeve 236b do not come loose or fall out of socket sleeve 236b. This arrangement permits such washers and nut, in one embodiment, to be securely maintained in proper orientation in order for the nut to be threadingly installed onto the threaded end of the bolt. Wave spring washers 242, by allowing a socket sleeve 236b to float or give somewhat if it impinges a surface, may also increase the spatial conformity of socket carrier assembly 228 and facilitate advancement of socket carrier assembly 228 and fastener retainers 226 (together with the fasteners held therein) into a difficult-to-access area, such as beneath a relatively low-clearance structure or flange, and/or such as a closed angled flange 244 of a structure, such as a rib structure 246 (FIG. 7).

Fastener socket 237 is configured for pivoting within socket carrier assembly 228. Fixedly attached to each socket 237 is a lever, or reaction, arm 250 which rotates, pivots, or otherwise moves with socket 237 with respect to socket carrier assembly 228. However, movement of sockets 237 and reaction arm 250 is limited to that permitted by the gap, generally 252, between outwardly extending tabs 254 provided on reaction bar 222 and reaction arms 250. As shown in FIG. 6, the forward edge 256 of a reaction arm 250 engages with abutment surface 258 of a tab 254 proximate a particular fastener retainer 226 when torque is applied to a fastener (not shown). In other words, once washers and a nut (not shown) held in a socket structure 236 are presented to the threaded end of a bolt (also not shown), and the bolt is tightened (using, e.g., a commercially available torque applicator or a plurality thereof) such that torque passes through the bolt to the nut retained by socket 237, the torque is transferred from the nut to socket 237, and in turn to the reaction arm 258 connected thereto. Those skilled in the art will appreciate that the torque is similarly transferred if socket 237 instead retains the head of the bolt (not shown) when a nut (also not shown) is being tightened at the opposite end of the bolt. The forward edge 256 of reaction arm 250 transfers this torque to abutment surface 258 of a tab 254 of reaction bar 222 proximate such reaction arm 250. Torque is transferred in the above-described manner when reaction bar 222 is fixed in the first, or "torque", position as shown in solid lines in FIG. 6.

Once the bolt has been tightened to a predetermined torque, the associated nut is positively engaged by and frictionally bound within the socket 237, in which it is located. This binding, or friction, between the nut or bolt head (not shown) and socket 237 makes it difficult to withdraw the socket from the nut without first releasing the torsional load still being transferred from socket 237 to reaction arm 250, and on to tab 254 of fixedly positioned reaction bar 222. In order to release this frictional torque-induced coupling of the socket 237 with the nut or bolt head (not shown), reaction bar 222 is moved to the right (as shown in FIG. 6) from its "torque" position indicated by solid lines to the "release" position indicated by dashed lines. Once in the release position, with the torque load now being relieved from socket 237, a gap 255 may be formed between the right side of reaction arm 250 and tab 254 (as shown in dashed lines in FIG. 6). This movement of reaction bar 222 is caused by the clockwise rotation of cam member 212 within opening 224 of reaction bar 222 such that the cam portion 214 of cam member 212 forces reaction bar 222 to the right (to the "release" position), thereby releasably reacting to the applied torque induced in socket 237. Referring once again to FIG. 6, the rotation of cam member 212 is caused by crank arm 208 being moved to the right from the position indicated by solid lines to the position indicated by dashed lines, and this movement of crank arm 208 is caused by the outward extension of shaft 220 from pneumatic cylinder 206.

When reaction bar 222 is moved to the "release" position, the torque load placed on socket 237 is relieved to the extent that socket 237 can readily be retracted, via retraction of support bar 230 in a manner discussed below, and disengaged from the torqued nut.

Also attached to body portion 202 is a socket wrench guide assembly, generally 260, having attachment flanges, generally 262a, 262b, 262c, which attach socket wrench guide assembly 260 to body portion 202. Socket wrench guide assembly 260 defines a plurality of recesses, generally 264, which serve to receive and guide an elongated shaft of a socket wrench (not shown). Socket wrench guide assembly 260 may be used to guide and support such a socket wrench during the tightening of bolts, ordinarily when fastening an adjacent rib structure spaced apart from the rib structure whose fasteners are engaged by sockets 237.

Figure 8:
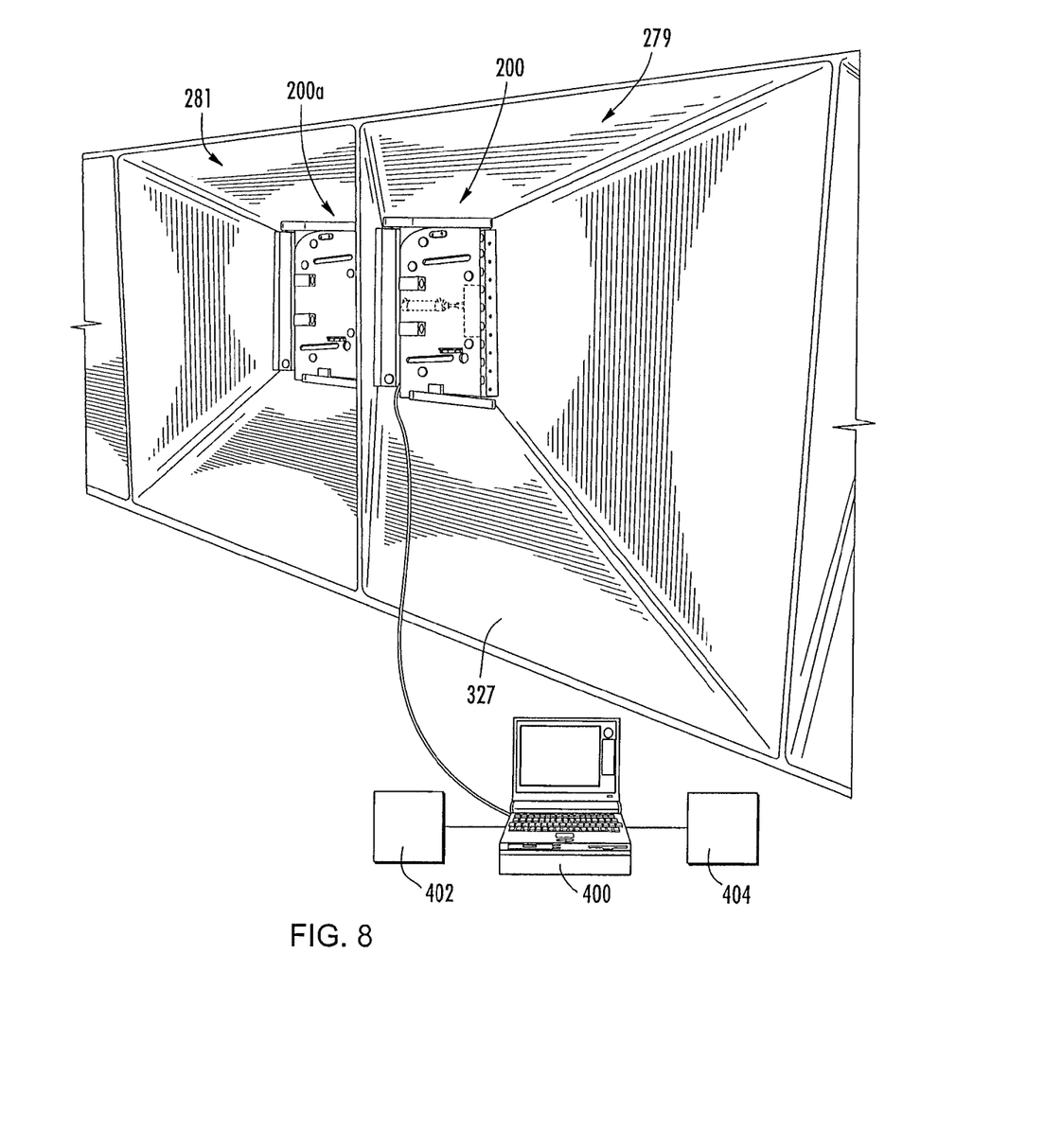
FIG. 8 illustrates a fastener installation apparatus according to one example embodiment located within a cavity or channel such as may be found in a rib bay of a horizontal stabilizer.

Referring to FIG. 3, also attached to body portion 202 are upstanding pneumatic cylinders 266 and 268 which are connected via hoses, generally 270, to an external pneumatic air supply 402 (FIG. 8). Pneumatic cylinders 266, 268 operate in a manner discussed in more detail below to extend and retract index pins 272, 274 (FIG. 4) when tool 200 is attached to a rib structure 246.

Brackets 276, 278 are also provided on body portion 202 and may be used for a variety of purposes, including, for attachment of a quick connect extension handle (not shown), which may be used for inserting tool 200 and a rib structure 246 into a cavity or remote location, such as a rib bay 279 (FIG. 8) of an airplane wing structure. Such quick disconnect extension handle may also facilitate the removal of tool 200 from a rib bay 279, upon tool 200 being removed from a rib structure 246 after the torquing of fasteners (such as bolts) in flange 244. It is noted that a tool 200 could be placed in adjacent rib bays 279 and 281, and the socket wrench guides 260 of a tool 200a in rib bay 281 could be used to tighten the bolts (not shown) to which the washers and nuts are being held by the tool 200 in rib bay 279. Alternately, instead of using a complete tool 200a in rib bay 281, a scaled down version without some of the mechanisms discussed above could be used.

Figure 4:
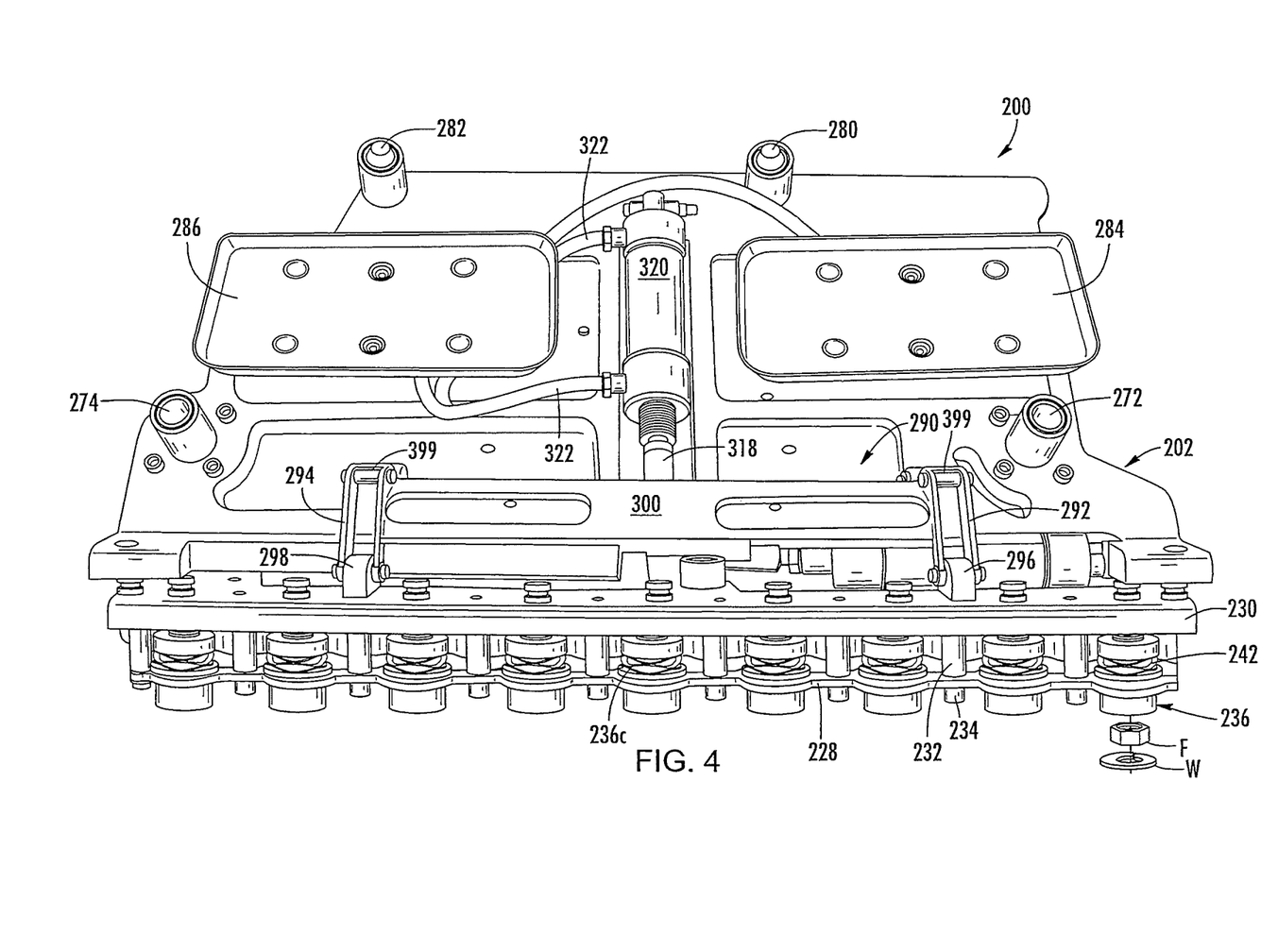
FIG. 4 illustrates the opposite side of the fastener installation apparatus shown in FIG. 3.

Referring now to FIG. 4, which shows the other side of one embodiment of tool 200, retractable index pins 272, 274 are shown in their retracted configuration. Additional index pins 280, 282 are also provided on this side of body portion 202. Index pins 280, 282 could be fixed, or also retractable, as desired. If such pins are fixed, they would in one embodiment be used to position tool 200 on a structure, such as rib structure 246, by engaging index holes in such rib structure. Upon such index pins 280, 282 being in place, retractable index pins 272, 274 could be advanced outwardly by activation of pneumatic cylinders 266, 268, respectively, into additional index holes (not shown) in rib structure 246. This provides four engagement points, namely, four pins received in four index holes of rib structure 246 to securely and positively locate tool 200 with respect to rib structure 246. Activation of pneumatic cylinders 266, 268 could take place directly or remotely from tool 200 if desired while tool 200 is outside of rib bay 279, but once tool 200 is in rib bay 279, activation of pneumatic cylinders 266, 268 takes place remotely, from outside of rib bay 279 after the fastener installation and torquing process has been completed.

Referring once again to FIG. 4, Tool 200 is held against rib structure 246 via a vacuum arrangement, using vacuum cups 284, 286 (which are attached to body portion 202). Vacuum cups 284, 286 are each connected to a vacuum generator and/or an external air and/or vacuum supply 402, 404 (FIG. 8) is used to cause a vacuum to be drawn by vacuum cups 284, 286, thereby securing tool 200 to rib structure 246, preferably once index pins 272, 274, 280, and 282 have already been inserted into their respective index holes in rib structure 246. Activation of vacuum cups 284, 286 could take place directly or remotely from tool 200 if desired while tool 200 is outside of rib bay 279, but once tool 200 is in rib bay 279, activation of vacuum cups 284, 286 takes place remotely, from outside of rib bay 279 in order to decouple tool 200 from rib structure 246 after the fastener installation and torquing process has been completed.

Once tool 200 is attached to rib structure 246, socket carrier assembly 228 is advancable towards closed angle flange 244 of rib structure 246. Prior to such advancement, in one embodiment, the desired washers and nuts (not shown) have already been loaded into the individual socket structures 236. Advancement of socket carrier assembly 228 forward allows the extreme forward end of each socket structure 236 to contact surfaces of flange 244 adjacent the threaded ends of bolts (not shown), which extend through openings 288 of closed angle flange 244. Once this contact has been made, further advancement of socket carrier assembly 226 would tend to compress wave spring washers 242.

Advancement of socket carrier assembly 228 is provided by advancement of support bar 230 to which socket carrier assembly 228 is attached. Support bar 230 is movable via a linkage structure, generally 290, which includes link arms 292, 294, each having one end pivotally attached to a pillow block bearing 296, 298 respectively of support bar 230. The other end of each link arm arrangement 292, 294 is connected to a pivotal bearing 299 provided on a longitudinally extending linkage bar 300 which is carried for generally rectilinear motion between a retracted position and an extended position. Support bar 230 includes at one end a linear bearing 306 and at the other end a linear bearing 308 (FIG. 3), which allow support bar 230 to move between the retracted position and the extended position. Linkage bar 300 is connected to a shaft 318 of a pneumatic cylinder 320 such that advancement and retraction of shaft 318 by a support actuator, such as pneumatic cylinder, 320 causes corresponding advancement and retraction of linkage bar 300 which, through the linkage arrangement discussed above, causes advancement and retraction of socket carrier assembly 228 and sockets 236 thereon. Pneumatic cylinder 320 is provided with pressurized air from external source 402 via hoses 322. Advancement and retraction of socket carrier assembly 228 could take place directly or remotely from tool 200 if desired while tool 200 is outside of rib bay 279, but once tool 200 is in rib bay 279, retraction of socket carrier assembly 228 takes place remotely, from outside of rib bay 279 in order to decouple tool 200 from rib structure 246 after the fastener installation and torquing process has been completed.

Hoses 270 and 322 are preferably bundled and carried within an umbilical 324 (FIG. 7) to the external pressurized air/vacuum sources discussed above.

As shown in FIG. 7, a roller and/or caster arrangement, generally 326, is provided on what becomes the lower edge of body portion 202 when tool 200 is attached to rib structure 246 (preferably on a workbench or other location outside of a rib bay or other cavity). As the combined rib structure/tool is inserted into place, it may be in one embodiment vertically disposed, such that roller/caster arrangement 326 is proximate a contact surface 327 (FIG. 8) on which tool 200 may be supported by such roller/caster arrangement 326 upon tool 200 becoming disengaged from rib structure 246. This disengagement typically occurs after the fasteners have been installed by sockets 236, the torque loads have been released therefrom through reaction bar 222 being moved to the "release" position (as discussed above), index pins 280, 282 being retracted by pneumatic cylinders 266, 268, and vacuum cups 284, 286 deactivated. Thus, once tool 200 has been released from rib structure 246, it can then be supported by roller/caster arrangement 326 and withdrawn from the rib bay or other cavity for example through use of a quick connect extension handle (not shown) discussed above.

Figure 5:
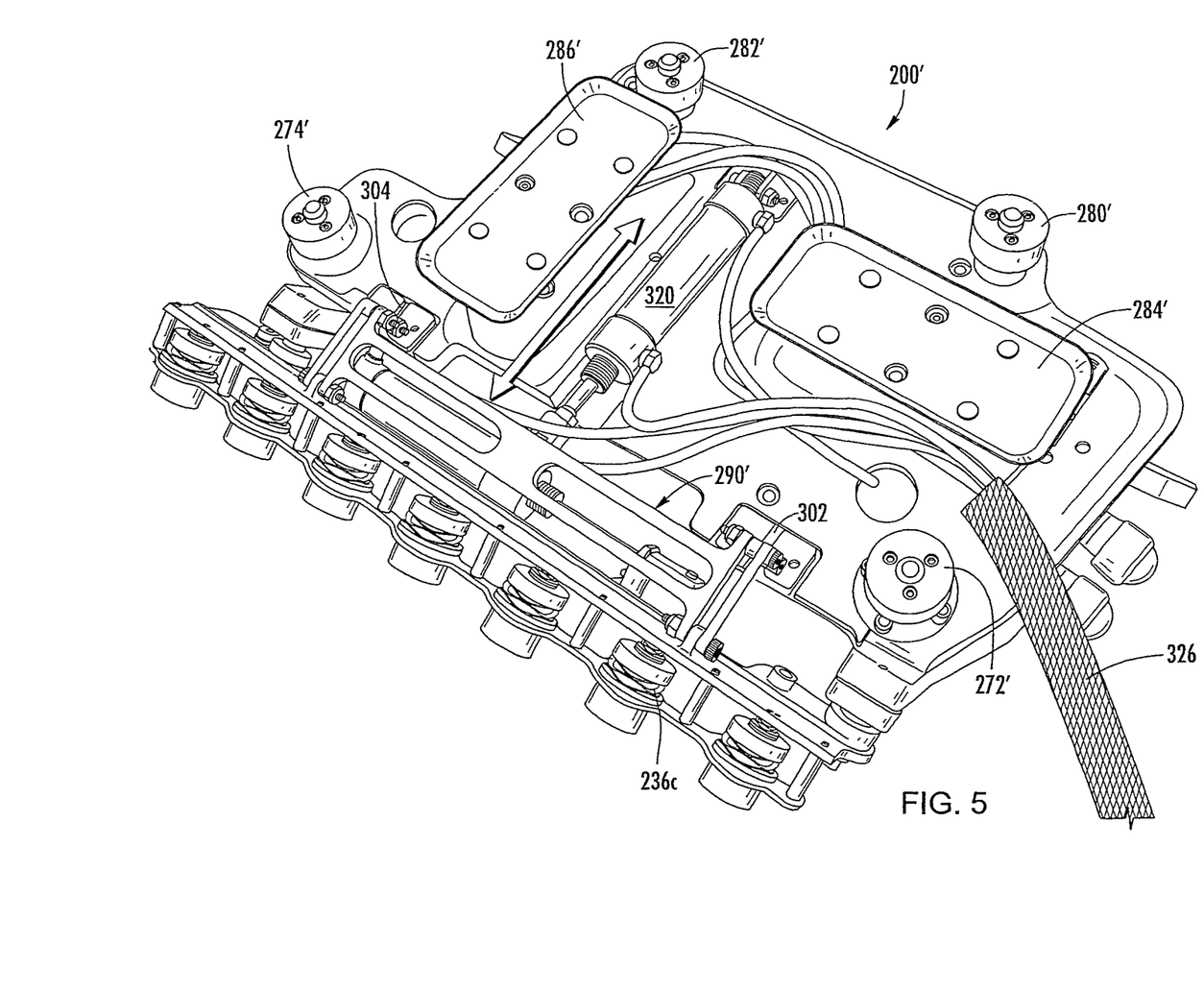
FIG. 5 illustrates a fastener installation apparatus according to another example embodiment.

FIG. 5 illustrates a further example embodiment of the disclosure and shows tool 200', which is similar to tool 200 in operation and construction, but has some variations in the design of vacuum cups 284' and 286' as well as index pin devices 272', 274', 280', and 282', and in linkage structure 290'. FIG. 5 illustrates linear bearings 302, 304 which are used by linkage structure 290' for rectilinear movement between the retracted and advanced positions.

A method of using tool 200 may include: loading a fastener such as a nut and one or more washers in each fastener retainer 226 (while support bar 230 is in the retracted position); positioning tool 200 over rib structure 246; aligning one or more fixed index pins 280, 282 with holes in rib structure 246 (retractable index pins 272, 274 would be in a retracted position to facilitate access of the socket carrier assembly 228 to pass under closed angle flange 244); using vacuum cups 284, 286 to attach tool 200 to rib structure 246; extending the retractable index pins 272, 274 into index holes (not shown) in rib structure 246; and extending support bar 230 such that socket structures 236 are in contact with the closed angle flange 244 to ensure full socket engagement.

Tool 200 and rib structure can be thus loaded together as a single unit into a channel, such as a rib bay 279 (FIG. 8) through use of one or more quick release handles (not shown), which releasably attach to brackets 276 and/or 278.

During the fastener torquing process, pneumatic cylinder 206 is in a retracted position, which moves reaction bar 222 to the left-most position shown in FIG. 6. All reaction arms 250 are held simultaneously by reaction bar 222 during the torquing procedure. Accordingly, arms 250 transmit to reaction bar 222 the cumulative preload torque force from all fasteners. It is this cumulative force that is to be released, via the motion of reaction bar 222 to the right-most position shown in FIG. 6, to free up all of the socket structures 236.

To release the torque preload, shaft 220 of pneumatic cylinder 206 will extend, thereby causing clockwise rotation of crank arm 208 and corresponding rotation of elongated member, or reaction cam, 212, which in turn moves reaction bar 222 in a direction away from reaction arms 250. The cam portion 214 is situated where the high point of the cam profile is naturally biased to move towards the "release" position, thereby reducing the force required by pneumatic cylinder 206 to release the torque preload through reaction bar 222.

Removal of tool 200 from a channel, such as rib bay 328, is accomplished (after the removal of the torque preload has been performed as discussed above) by reattaching one or more quick connect extension handles (not shown), which releasably attach to brackets 276 and/or 278. Retractable index pins 272, 274 are retracted from index holes (not shown) in rib structure 246, and vacuum cups 284, 286 are deactivated, thereby disengaging tool 200 from rib structure 246 and allowing tool 200 to drop slightly from rib structure 246 to a surface such as floor 330 of rib bay 328. At this point, tool 200 is supported on rollers and/or casters 326 and may be drawn from rib bay 328 on such casters using the quick connect extension handles.

As can be seen from the foregoing, tool 200 facilitates the attachment thereto to a rib structure 246 remote from a cavity or channel, and such could take place at an ergonomically friendly bench height, if desired. Use of tool 200 may also reduce potential foreign object debris (FOD) issues of dropped washers or nuts in such cavity or channel.

The remote control operation of tool 200, including the actuation of its pneumatic cylinders 206, 266, 268, and 320, can be manually actuated through use of manually controlled valves (none shown) for actuating pneumatic cylinders 206, 266, 268, and 320 and/or actuated by a processor, generally 400, if desired, which may be connected to a pressurized air supply, generally 402, which could be external to or carried by tool 200 and/or a vacuum supply 404, which could also be external to or carried by tool 200. Processor 400 may be configured to be: an index pin actuator, controlling pressurized air to pneumatic cylinders 206 and 266; a support actuator, controlling pressurized air to pneumatic cylinder 320; a reaction bar actuator, controlling pressurized air to pneumatic cylinder 206; and/or a vacuum actuator for controlling supply of vacuum to vacuum cups 284, 284', 286, and 286', if desired.

The processor 400 is generally any piece of hardware that is capable of processing information such as, for example, data, computer-readable program code, instructions or the like (generally "computer programs," e.g., software, firmware, etc.), and/or other suitable electronic information. More particularly, for example, the processor 400 may be configured to execute computer programs, which may be stored onboard the processor 400 or otherwise stored in a memory (not shown). The processor 400 may be a number of processors, a multi-processor core or some other type of processor, depending on the particular implementation. Further, the processor 400 may be implemented using a number of heterogeneous processor apparatuses in which a main processor is present with one or more secondary processors on a single chip. As another illustrative example, the processor 400 may be a symmetric multi-processor apparatus containing multiple processors of the same type. In yet another example, the processor 400 may be embodied as or otherwise include one or more application-specific integrated circuits (ASICs), field-programmable gate arrays (FPGAs) or the like. Thus, although the processor 400 may be capable of executing a computer program to perform one or more functions, the processor 400 of various examples may be capable of performing one or more functions without the aid of a computer program.

The memory is generally any piece of hardware that is capable of storing information such as, for example, data, computer programs and/or other suitable information either on a temporary basis and/or a permanent basis. In one example, the memory may be configured to store various information in one or more databases. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor 400 may also but need not be connected to one or more interfaces for displaying, transmitting and/or receiving information. The interfaces may include one or more communications interfaces (none shown) and/or one or more user interfaces. The communications interface may be configured to transmit and/or receive information, such as to and/or from other apparatus(es), network(s) or the like. The communications interface may be configured to transmit and/or receive information by physical (by wire) and/or wireless communications links. Examples of suitable communication interfaces include a network interface controller (NIC), wireless NIC (WNIC) or the like.

The user interfaces may include a display and/or one or more user input interfaces. The display may be configured to present or otherwise display information to a user, suitable examples of which include a liquid crystal display (LCD), light-emitting diode display (LED), plasma display panel (PDP) or the like. The user input interfaces may be by wire or wireless, and may be configured to receive information from a user into tool 200, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the system, apparatuses and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method of using a tool including a plurality of retaining elements to join a first part and a second part with a first plurality of fasteners and a second plurality of fasteners, the method comprising:
 installing said first plurality of fasteners in said plurality of retaining elements;
 associating said first part and said second part in a desired orientation for joining;
 positioning the tool in a cavity of a structure to facilitate torsional engagement between the first plurality of fasteners and the second plurality of fasteners;
 selectively advancing at least one index pin from said tool into engagement with said first part;
 selectively retracting said at least one index pin out of engagement with said first part, wherein the step of selectively retracting said at least one index pin out of engagement with said first part is initiated from outside of said cavity;
 installing said second plurality of fasteners, sequentially or simultaneously, in mating openings formed in said first part and said second part;
 configuring the tool to prevent rotation of said first plurality of fasteners;
 joining the first part and the second part by applying a torque, sequentially or simultaneously, to said second plurality of fasteners to cause said second plurality of fasteners to rotationally engage said first plurality of fasteners, wherein said torque is transmitted from said second plurality of fasteners to said first plurality of fasteners and at least a portion of said torque is transmitted from said first plurality of fasteners to said plurality of retaining elements preventing rotation of said first plurality of fasteners;
 simultaneously eliminating transmission of the at least a portion of said torque from said first plurality of fasteners to said plurality of retaining elements; and
 withdrawing the tool from said first plurality of fasteners, said first part, and the second part joined to said first part.

2. The method of claim 1, wherein said step of simultaneously eliminating transmission of the at least a portion of said torque from said first plurality of fasteners to said plurality of retaining elements comprises activating a lever arm on said tool that simultaneously removes the at least a portion of said torque from each of the plurality of said retaining elements.

3. The method of claim 2, further comprising the step of initiating from outside of said cavity said step of activating said lever arm on said tool.

4. The method of claim 2, wherein said step of positioning the tool relative to said first part and said second part to facilitate torsional engagement between the first plurality of fasteners and the second plurality of fasteners further comprises said tool including a body portion and selectively simultaneously moving said plurality of retaining elements outwardly from said body portion into engagement with said first part.

5. The method of claim 1, wherein said step of positioning the tool relative to said first part and said second part to facilitate torsional engagement between the first plurality of fasteners and the second plurality of fasteners includes application of vacuum to at least one vacuum cup connected to said tool.

6. The method of claim 1, wherein:
 said step of positioning the tool relative to said first part and said second part to facilitate torsional engagement between the first plurality of fasteners and the second plurality of fasteners includes application of vacuum to at least one vacuum cup connected to said tool; and
 said step of withdrawing the tool from said first plurality of fasteners, said first part, and the second part joined to said first part further comprises initiating, from outside of said cavity, ceasing of application of vacuum to said at least one vacuum cup.

7. The method of claim 1, wherein:
 said step of positioning the tool relative to said first part and said second part to facilitate torsional engagement between the first plurality of fasteners and the second plurality of fasteners further comprises said tool including a body portion and selectively simultaneously moving said plurality of retaining elements outwardly from said body portion into engagement with said first part; and
 said step of withdrawing the tool from said first plurality of fasteners, said first part, and the second part joined to said first part further comprises initiating from outside of said cavity said simultaneously moving of said plurality of retaining elements inwardly towards said body portion.

8. The method of claim 1, wherein said step of positioning the tool relative to said first part and said second part to facilitate torsional engagement between the first plurality of fasteners and the second plurality of fasteners further comprises selectively advancing at least one index pin from said tool into engagement with said first part.

9. A method of using a tool, comprising a plurality of retaining elements, to join a first part and a second part with a first plurality of fasteners and a second plurality of fasteners, the method comprising steps of:
 installing said first plurality of fasteners in said plurality of retaining elements;
 associating said first part and said second part in a desired orientation for joining;
 positioning the tool relative to said first part and said second part to facilitate torsional engagement between the first plurality of fasteners and the second plurality of fasteners, wherein the tool further comprises:
  a body portion;
  a plurality of index pins that engage and align said body portion with a structure;
  at least one of said index pins being configured to move between a retracted position generally out of engagement with the structure and an extended position in engagement with the structure; and an index-pin actuator that moves said at least one of said index pins between said retracted position and said extended position;

installing said second plurality of fasteners, sequentially or simultaneously, in mating openings formed in said first part and said second part;

configuring the tool to prevent rotation of said first plurality of fasteners; joining the first part and the second part by applying a torque, sequentially or simultaneously, to said second plurality of fasteners to cause said second plurality of fasteners to rotationally engage said first plurality of fasteners, wherein said torque is transmitted from said second plurality of fasteners to said first plurality of fasteners and at least a portion of said torque is transmitted from said first plurality of fasteners to said plurality of retaining elements, preventing rotation of said first plurality of fasteners;

simultaneously eliminating transmission of at least the portion of said torque from said first plurality of fasteners to said plurality of retaining elements; and withdrawing the tool from said first plurality of fasteners, said first part, and the second part, joined to said first part and wherein said step of positioning the tool relative to said first part and said second part to facilitate torsional engagement between the first plurality of fasteners and the second plurality of fasteners comprises positioning the tool in a cavity.

10. The method of claim 9, wherein said step of positioning the tool relative to said first part and said second part to facilitate torsional engagement between the first plurality of fasteners and the second plurality of fasteners comprises applying vacuum to at least one vacuum cup connected to said tool.

11. The method of claim 9, wherein said step of positioning the tool relative to said first part and said second part to facilitate torsional engagement between the first plurality of fasteners and the second plurality of fasteners further comprises selectively advancing at least one of the index pins from said tool into engagement with said first part.

12. The method of claim 9, wherein:
said step of positioning the tool relative to said first part and said second part to facilitate torsional engagement between the first plurality of fasteners and the second plurality of fasteners comprises applying vacuum to at least one vacuum cup connected to said tool; and
said step of withdrawing the tool from said first plurality of fasteners, said first part, and the second part, joined to said first part, further comprises initiating, from outside of said cavity, ceasing of application of vacuum to said at least one vacuum cup.

13. The method of claim 9, wherein:
said step of positioning the tool relative to said first part and said second part to facilitate torsional engagement between the first plurality of fasteners and the second plurality of fasteners further comprises selectively simultaneously moving said plurality of retaining elements outwardly from said body portion into engagement with said first part; and
said step of withdrawing the tool from said first plurality of fasteners, said first part, and the second part, joined to said first part, further comprises initiating from outside of said cavity said simultaneously moving of said plurality of retaining elements inwardly towards said body portion.

14. The method of claim 9, wherein said step of simultaneously eliminating transmission of at least the portion of said torque from said first plurality of fasteners to said plurality of retaining elements comprises activating a lever arm on said tool that simultaneously removes at least the portion of said torque from each of said plurality of retaining elements.

15. The method of claim 14, wherein the step of activating said lever arm on said tool is initiated from outside of said cavity.

16. The method of claim 14, wherein said step of positioning the tool relative to said first part and said second part to facilitate torsional engagement between the first plurality of fasteners and the second plurality of fasteners further comprises selectively simultaneously moving said plurality of retaining elements outwardly from said body portion into engagement with said first part.

17. The method of claim 9, wherein said step of positioning the tool relative to said first part and said second part to facilitate torsional engagement between the first plurality of fasteners and the second plurality of fasteners further comprises:
selectively advancing at least one of the index pins from said tool into engagement with said first part;
selectively retracting said at least one of the index pins out of engagement with said first part after said step of positioning said first part within said cavity; and
initiating from outside of said cavity said step of selectively retracting said at least one of the index pins out of engagement with the first part.

* * * * *